United States Patent [19]
Tseng et al.

[11] Patent Number: 5,617,334
[45] Date of Patent: Apr. 1, 1997

[54] MULTI-VIEWPOINT DIGITAL VIDEO CODER/DECODER AND METHOD

[75] Inventors: Belle L. Tseng, New York, N.Y.; Dimitris Anastassiou, Tenafly, N.J.

[73] Assignee: The Trustees of Columbia University in the City of New York, New York, N.Y.

[21] Appl. No.: 505,051

[22] Filed: Jul. 21, 1995

[51] Int. Cl.⁶ .................................................. G06F 17/00
[52] U.S. Cl. ............................................................ 364/514 R
[58] Field of Search ........................... 364/514 R, 514 A, 364/715.02; 382/131; 348/387, 398, 43, 51

[56] References Cited

U.S. PATENT DOCUMENTS

| | | | |
|---|---|---|---|
| 4,691,329 | 9/1987 | Juri et al. | 382/131 |
| 5,043,806 | 8/1991 | Choquet et al. | 382/131 |
| 5,229,935 | 7/1993 | Yamagishi et al. | 364/413.22 |
| 5,382,979 | 1/1995 | Mun | 348/398 |
| 5,384,861 | 1/1995 | Mattson et al. | 348/51 |

*Primary Examiner*—Ellis B. Ramirez
*Attorney, Agent, or Firm*—Brumbaugh, Graves, Donohue & Raymond

[57] ABSTRACT

The multi-viewpoint video encoder disclosed herein comprises a depth estimator, a predictor connected to the depth estimator, and a comparator connected to the predictor. In addition, the multi-viewpoint video encoder has an output, preferably including a multiplexer for multiplexing the first image, the depth map, the second viewpoint vector and the prediction errors into a signal. The multi-viewpoint video encoder also includes a depth map encoder/compressor. The depth map is compressed according to a video compression standard, preferably compatible with the MPEG-2 standard. The multi-viewpoint video encoder further includes a first image encoder. The first image is encoded according to a video coding standard, preferably compatible with the MPEG-2 standard. In this manner, an MPEG-2 monitor can display the first image video without any further modifications. Many of the elements described above are already found in MPEG-2 encoders. Accordingly, a multi-viewpoint video encoder only requires the addition of the depth estimator and the predictor mentioned above. A multi-viewpoint video decoder as well as methods to encode and decode multi-viewpoint video are also disclosed herein.

46 Claims, 6 Drawing Sheets

MULTI-VIEWPOINT DIGITAL VIDEO CODER/DECODER AND METHOD

FIELD OF THE INVENTION

The present invention related to video decoding and encoding apparatus and method and, more particularly, to a multi-viewpoint digital video coder/decoder and method.

BACKGROUND OF THE INVENTION

A multi-viewpoint video is a three-dimensional extension of the traditional movie sequence, in that multiple perspectives of the same scene exist at any instance in time. In other words, the multi-viewpoint video offers the capability of "looking around" objects in a scene. Thus, typical uses may include interactive applications, medical surgery technologies, remote sensing development, virtual reality games, etc.

With the development of digital video technology, a video data compression standard, namely the second Motion Picture Experts Group specification (MPEG-2), has been adopted by the International Standards Organization (ISO) and the International Telecommunications Union (IUT). MPEG-2 is a coding standard specified for one video sequence. MPEG-2 has also been recently shown to be applicable to two sequences of stereoscopic signals through the use of additional vectors. For purposes of this application, the relevant parts of sections 6 and 7 of the ISO document DIS 13818-2 will be hereinafter referred to as the "MPEG-2 standard."

However, extending the number of viewpoint videos beyond two views cannot be done practically by using the same methodology as the number of vectors would grow exponentially. Instead, a multi-viewpoint coder/decoder should compress the digital information so that information can be sent using as little bandwidth as possible.

In addition, a multi-viewpoint coder/decoder should be compatible with prior standards. In other words, while a TV may not properly show the different viewpoints in the multi-viewpoint video, the TV should be able to decode one viewpoint.

A multi-viewpoint coder/decoder should also be open-ended. In this manner, individual coding modules can be improved in accordance with any technological advances as well as the creativity and inventive spirits of software providers. An open-ended scheme would also allow a person to adjust the quality of the multi-viewpoint video according to system requirements and variables. Furthermore, such scheme would be easily expandable to provide as many video viewpoints as desired.

Finally, a multi-viewpoint coder/decoder should be hardware-based, instead of software-based. In this manner, fast and efficient coding/decoding can be achieved.

SUMMARY OF THE INVENTION

The multi-viewpoint video encoder disclosed herein comprises a depth estimator, a predictor connected to the depth estimator, and a comparator connected to the predictor. In addition, the multi-viewpoint video encoder has an output, preferably including a multiplexer for multiplexing the first image, the depth map, the second viewpoint vector and the prediction errors into a signal.

The multi-viewpoint video encoder also includes a depth map encoder/compressor. The depth map is compressed according to a video compression standard, preferably compatible with the MPEG-2 standard.

The multi-viewpoint video encoder further includes a first image encoder. The first image is encoded according to a video coding standard, preferably compatible with the MPEG-2 standard. In this manner, an MPEG-2 monitor can display the first image video without any further modifications.

Many of the elements described above are already found in MPEG-2 encoders. Accordingly, a multi-viewpoint video encoder only requires the addition of the depth estimator and the predictor mentioned above.

To encode multi-viewpoint video, a first image having a first viewpoint vector is selected. A depth map is formed for this image. A second image having a second viewpoint vector is also selected. A predicted second image having the second viewpoint vector is then predicted by manipulating the first image and the depth map to reflect the second viewpoint vector. The prediction errors required for reconstructing the second image from the predicted second image are calculated by comparing the second image and the predicted second image.

The first image, the depth map, the second viewpoint vector and the prediction errors are transmitted, preferably they are multiplexed into a signal. Before transmission, the depth map could be compressed according to a video compression standard, preferably compatible with the MPEG-2 standard. Similarly, the first image should be encoded according to a video coding standard, such as the MPEG-2 standard.

The multi-viewpoint video decoder disclosed herein comprises a receiver, a predictor connected to the receiver, and a reconstructor connected to the receiver and the predictor. The predictor further includes a manipulator. In addition, the multi-viewpoint video decoder may include a depth map decompressor connected between the receiver and the predictor.

Many of the elements described above are already found in MPEG-2 decoders. Accordingly, a multi-viewpoint video decoder only requires the addition of the predictor, as mentioned above.

In order to provide video in a desired viewpoint, the multi-viewpoint video decoder must include a receiver and a predictor connected to the receiver. This predictor has a manipulator. The multi-viewpoint video decoder may also include a depth map decompressor connected between the receiver and the predictor.

In addition, the multi-viewpoint video decoder further includes a constructor connected to the predictor. The constructor also includes a memory.

As discussed above, many of the elements required are already found in MPEG-2 decoders. Accordingly, a multi-viewpoint video decoder requires only the addition of the predictor mentioned above. The multi-viewpoint video decoder may also include a constructor connected to the predictor. Such decoder should also include means for obtaining the desired viewpoint vector.

To decode multi-viewpoint video, a decoder must receive a first image having a first viewpoint, a depth map, a second viewpoint vector and prediction errors. A predicted second image having the second viewpoint vector is then formed by manipulating the first image and the depth map to reflect the second viewpoint vector. Further, a second image having the second viewpoint vector then reconstructed by combining the prediction errors and the predicted second image.

If a viewpoint different from the second viewpoint is desired, the following method applies: a decoder must receive a first image having a first viewpoint, a depth map, a second viewpoint vector and prediction errors. A predicted second image having the desired viewpoint vector is then formed by manipulating the first image and the depth map to reflect the desired viewpoint vector. If possible, a second image having the desired viewpoint vector can be constructed by combining a first stored mesh, a second stored mesh, a first stored image, a second stored image, and the predicted second image. The first stored image is a nearest past stored image reconstructed by combining the prediction errors and the predicted second image. The first stored mesh is a stored mesh respective to the nearest stored past reconstructed image. Similarly, the second stored image is a nearest future image reconstructed by combining the prediction errors and the predicted second image. The second stored mesh is a stored mesh respective to the nearest stored future reconstructed image.

BRIEF DESCRIPTION OF THE DRAWINGS

Now the present invention will be described in detail by way of exemplary embodiments with reference to the accompanying drawings in which.

DETAILED DESCRIPTION

Figure 1:
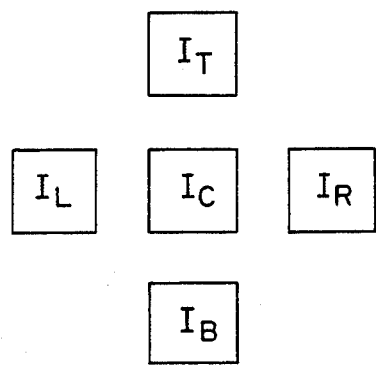
FIG. 1 illustrates the viewpoint image arrangement referred to throughout the specification.

FIG. 1 illustrates the viewpoint image arrangement, i.e., the positioning of the cameras, to be encoded by the multi-viewpoint video encoder of the present invention. The images referred to hereinafter will correspond to the viewpoint image arrangement. Accordingly, $I_C$ will have a central viewpoint, $I_T$ will have a top viewpoint, $I_B$ will have a bottom viewpoint, $I_R$ will have a right viewpoint, and $I_L$ will have a left viewpoint.

Figure 2:
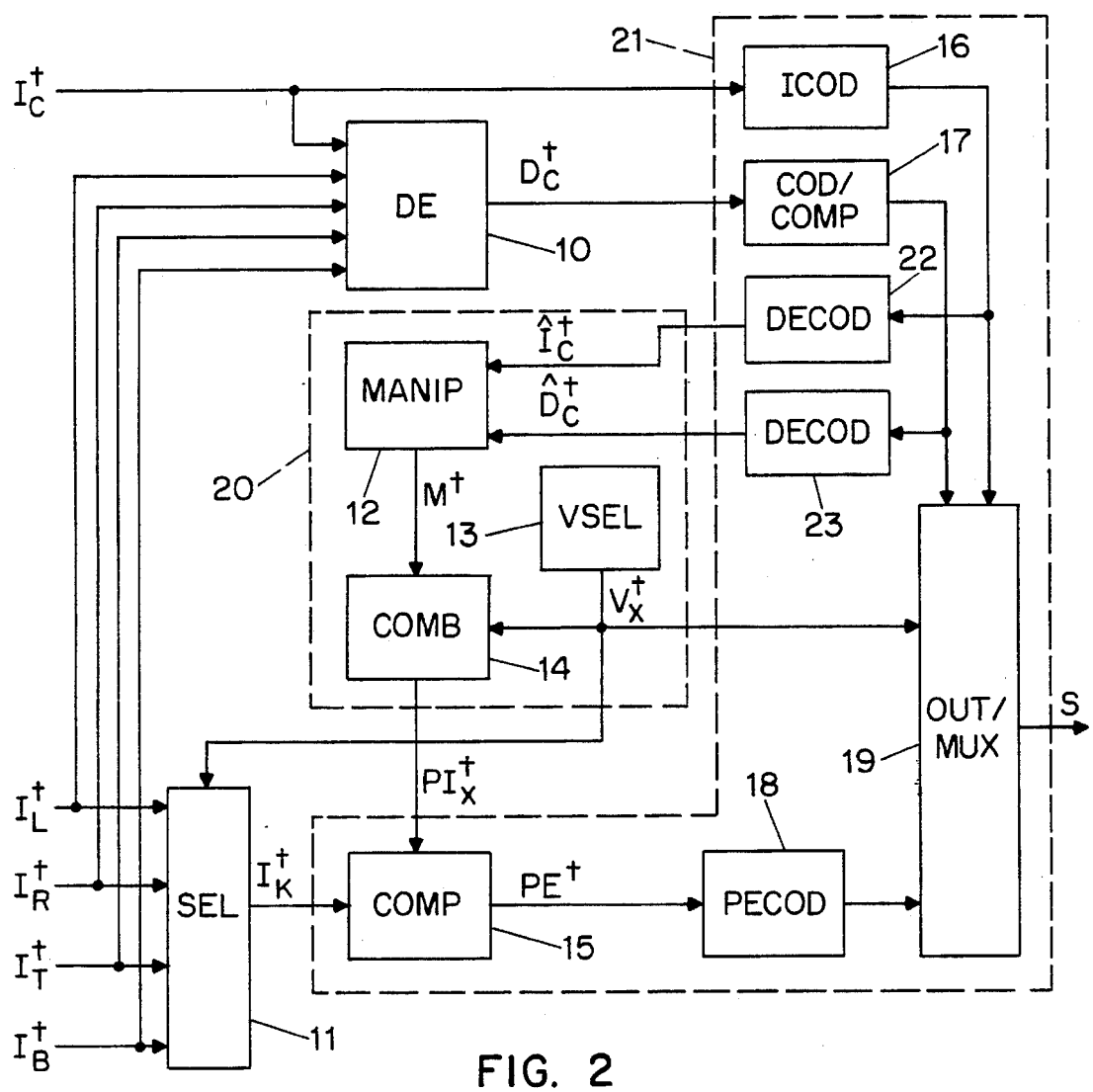
FIG. 2 illustrates a block diagram of an embodiment of the multi-viewpoint encoder of the present invention.

FIG. 2 schematically illustrates an embodiment of the multi-viewpoint video encoder of the present invention. The encoder has a depth estimator 10. The depth estimator 10 creates a depth map $D_c^t$ for the central image $I_c^t$. The central image $I_c^t$ has a first viewpoint vector, namely the central viewpoint vector. The depth map $D_c^t$ is created from the multiple viewpoint images, in the manner described below.

The depth of an object can be geometrically calculated if two or more perspectives of the object are given. First, the positions of the object in each of the available viewpoint images must be located. The simplest method is to use the same matching techniques used in estimating motion for a temporal sequence of images. These techniques include: (1) correlation matching, as described in Andreas Kopernik and Danielle Pele, "Disparity Estimation for Stereo Compensated 3DTV Coding," 1993 Picture Coding Symposium, March 1993, Lausanne, Switzerland; (2) relaxation matching, as described in D. Marr and T. Poggio, "Cooperative Computation of Stereo Disparity," *Science*, vol. 194, pp. 283–287 (1976); and (3) coarse-to-fine matching, as described in Dimitrios Tzovaras, Michael G. Strintzis, and Ioannis Pitas, "Multiresolution Block Matching Techniques for Motion and Disparity Estimation," 1993 Picture Coding Symposium, March 1993 Lausanne, Switzerland. Other algorithms can be found throughout the computer vision field of art.

After locating the object, the difference in image coordinates is termed disparity. The depth distance of the object is inversely proportional to the derived disparity. Depth estimation/disparity estimation algorithms are widely available in current literatures. A few classical methods for calculating depth are provided in Berthold Klaus and Paul Horn, *Robot Vision*, MIT Press (1986), and Stephen Barnard and Martin Fischler, "Computational Stereo," in ACM Computing Surveys, vol. 14, no. 4, December 1982, pp. 553–572. Another method was described in Shree K. Nayar, Masahiro Watanabe, Minori Noguchi, "Real-Time Focus Range Sensor," Fifth International Conference on Computer Vision, Cambridge, Mass., June 1995. Other algorithms can be found throughout the computer vision field of art.

The matching and disparity algorithms mentioned above can be used in the preferred embodiments of the invention. The specific algorithm to be used in matching and determining disparity, however, depend on the system capabilities, including processing speed, bandwidth capability, desired picture quality, number of available viewpoint images, etc. Nevertheless, the algorithms should be translated into a hardware solution, either hard-wired, logic table-based, etc., so that the images can be processed at a faster rate than with a software solution.

The central image $I_c^t$ is then encoded by the image encoder 16 in a format compatible with section 7 of the ISO document DIS 13818-2. Such an encoder is described in U.S. Pat. No. 5,193,004, issued to Feng Ming Wang and Dimitris Anastassiou. By encoding the image $I_c^t$ in a format compatible with the MPEG-2 specification, any MPEG-2 monitor may be able to decode the information and display the image. Such monitor, however, will not be able to decode the multi-viewpoint video unless it is equipped with the extra hardware described below. Similarly the depth map $D_c^t$ is also encoded and compressed in a format that is compatible with section 7 of the DIS 13818-2 and/or MPEG Test Model 5 (ISO Doc. ISO-IEC/JTC1/SC29/WG11/N0400), by the encoder/compressor 17. Such an encoder is described in U.S. Pat. No. 5,193,004, issued to Feng Ming Wang and Dimitris Anastassiou.

After being encoded both the image $I_c^t$ and the depth map $D_c^t$ are decoded by decoder 22 and decoder 23, respectively. By using the decoded image $I_c^t$ and depth map $D_c^t$ (hereinafter image $\hat{I}_c^t$ and depth map $\hat{D}_c^t$, respectively), the encoder will base its coding on the same data the decoder will receive, allowing for better results.

The predictor 20 predicts a predicted second image having a second selected viewpoint vector. The predictor 20 contains three essential components. First, a matrix manipulator 12 forms a mesh or 3-D matrix $M^t$ by combining the image $I_c^t$ and the depth map $D_c^t$. For every image point $I_c^t(x_c, y_c)$ there is provided a corresponding depth value $z_c = D_c^t(x_c, y_c)$. Accordingly, this set of 3D coordinate information $(x_c, y_c, z_c)$ is similar to a 3D geometrical model or mesh. In other words, by combining the two-dimensional matrix $\hat{I}_c^t$ with the corresponding depth values from the depth map $\hat{D}_c^t$, a 3-D matrix or mesh is created. A corresponding texture map incorporating the intensity values for each coordinate is also kept. This process is further explained in James Foley et al., *Computer Graphics Principles and Practice*, Addison-Wesley Publishing Co. (2d ed. 1990). In addition, hardware-based solutions for this manipulator can be found throughout the computer graphics field.

Figure 4:
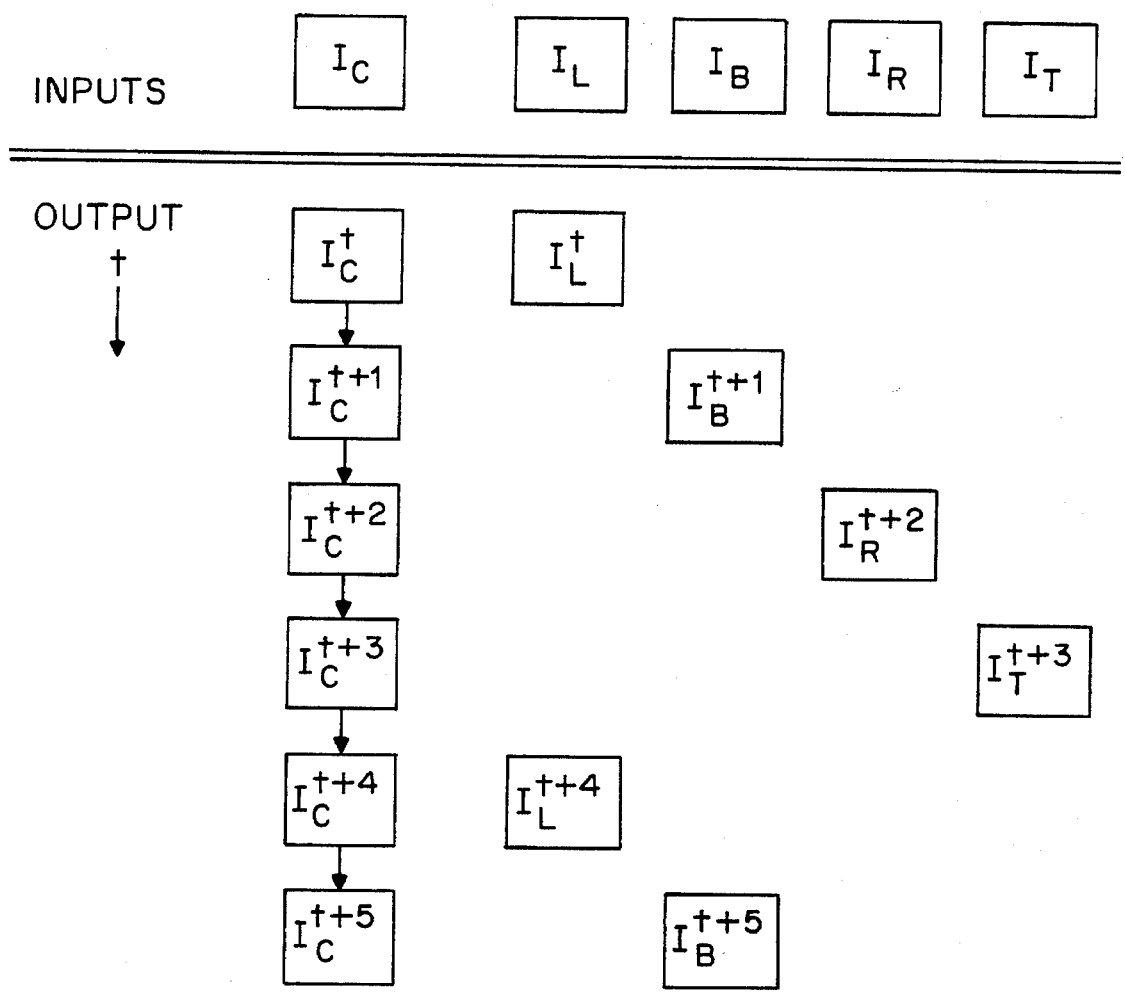
FIG. 4 is a "round robin" prediction structure for the encoder selection of viewpoints, wherein the encoder only selects one viewpoint at a time.
Figure 5:
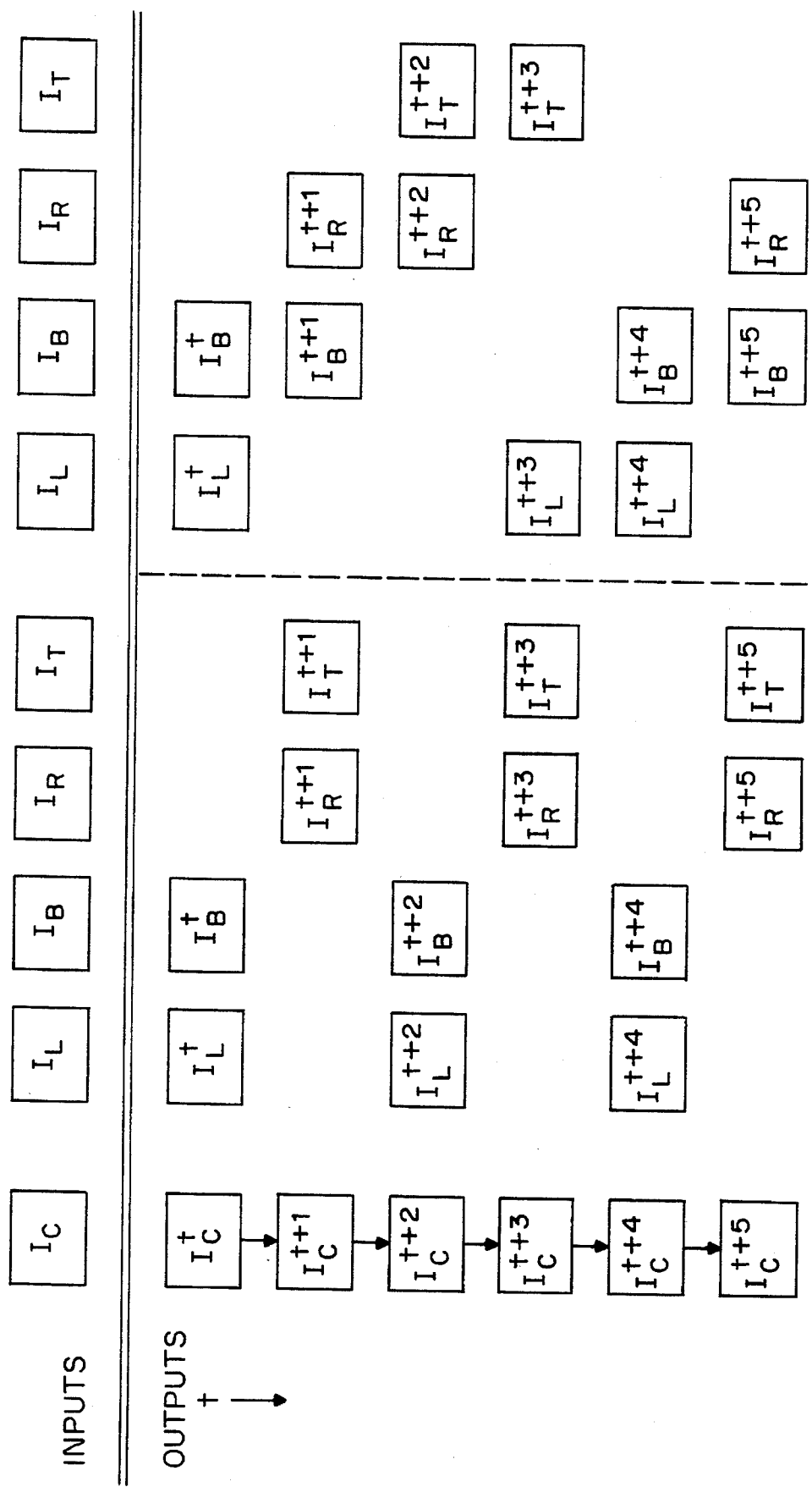
FIG. 5 is two alternative "round robin" prediction structures for the encoder selection of viewpoints, wherein the encoder selects two viewpoints at a time.

In addition, the predictor 20 has a vector selector 13. The vector selector 13 selects a vector $V_X^t$. The vector $V_X^t$ is selected in a "round robin" rotational basis amongst the directional vectors of the four non-central images of FIG. 1, i.e., $I_L$, $I_B$, $I_R$, and $I_T$. As shown in FIG. 4, the selected vector/image sequence as related to time t would be $I_L^t$, $I_B^{t+1}$, $I_R^{t+2}$, $I_T^{t+3}$, $I_L^{t+4}$, $I_B^{t+5}$, $I_R^{t+6}$, ..., etc. As discussed below, FIG. 5 illustrates alternative selected vectors/images sequences as related to time t if the bandwidth permits the encoding of three images.

Finally, referring again to FIG. 2, the predictor 20 also includes a combiner 14. The combiner 14 interpolates the mesh $M^t$ with the selected vector $V_X^t$. In this manner, the resulting predicted image $PI_X^t$ will portray the mesh $M^t$ in the viewpoint of vector $V_X^t$. This process is further explained in James Foley et al., *Computer Graphics Principles and Practice*, Addison-Wesley Publishing Co. (2d ed. 1990). In addition, hardware-based solutions for this combiner can be found throughout the computer graphics field.

The output of the vector selector 13 is used to trigger The selector 11 assures that the image $I_X^t$ sent to the comparator 15 will have the same viewpoint as the selected vector $V_X^t$. In other words, if the selected vector $V_X^t$ is the viewpoint vector of image $I_L^t$, selector 11 will send image $I_L^t$ to the comparator 15.

The comparator 15 then compares the predicted image $PI_X^t$ with the selected image $I_X^t$ in order to calculate the prediction errors $PE^t$ required to reconstruct image $I_X^t$ from predicted image $PI_X^t$. The prediction errors $PE^t$ are calculated by examining the differences between the image $I_X^t$ and the predicted image $PI_X^t$. The comparator 15 calculates prediction errors in the usual manner of MPEG-2 encoders, i.e., compatible with section 7 of the ISO document DIS 13818-2. The prediction error encoder 18 then encodes the prediction errors $PE^t$ according to the MPEG-2 specification.

The encoded central image $I_c^t$, depth map $D_c^t$ and prediction errors $PE^t$ are then multiplexed into a signal S along with the selected vector $V_X^t$ by the output/multiplexer 19. The MPEG-2 syntax of the encoded bitstreams is found in section 6 of the ISO document DIS 13818-2. Additionally, the encoder may also transmit an MPEG-2 header containing the directional information, i.e., the directional vectors, of $I_C^t$, $I_L^t$, $I_B^t$, $I_R^t$, and $I_T^t$.

The comparator 15, the encoders 16, 17 and 18, the output/multiplexer 19, and the decoders 22 and 23 are all found in MPEG-2 encoder 21.

Figure 3:
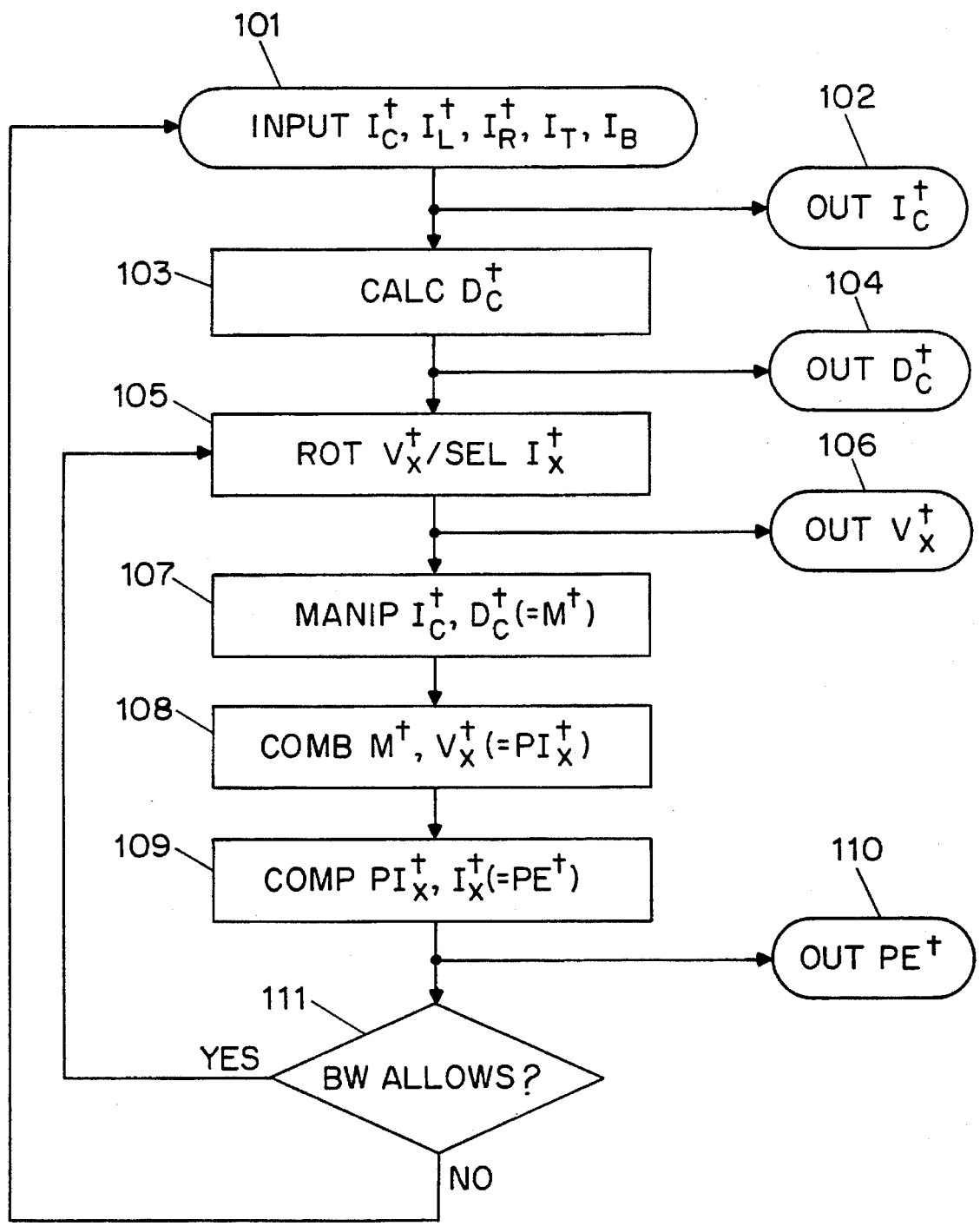
FIG. 3 is a flow chart illustrating the encoding process of the multi-viewpoint encoder of the present invention.

FIG. 3 illustrates the flow chart of the method for encoding multi-viewpoint video. In Step 101 the images $I_C^t$, $I_L^t$, $I_B^t$, $I_R^t$, and $I_T^t$ are inputted into the multi-viewpoint video encoder of FIG. 2. The central image $I_C^t$ is then encoded and outputted according to the MPEG-2 specification (ST 102). In addition, the encoded image $I_C^t$ is decoded for use within the process (herein image $\hat{I}_c^t$).

A depth map $D_C^t$ is then calculated using the information in images $I_C^t$, $I_L^t$, $I_B^t$, $I_R^t$, and $I_T^t$ as mentioned above (ST 103). The depth map $D_C^t$ is also encoded and outputted according to the MPEG-2 specification (ST 104). In addition, the encoded depth map $D_C^t$ is decoded for use within the process (herein depth map $\hat{D}_c^t$).

In Step 105, a vector $V_X^t$ is selected in a "round robin" rotational basis amongst the directional vectors of the four non-central images of FIG. 1, i.e., $I_L$, $I_B$, $I_R$, and $I_T$. As shown in FIG. 4, the selected vector/image sequence as related to time t would be $I_L^t$, $I_B^{t+1}$, $I_R^{t+2}$, $I_T^{t+3}$, $I_L^{t+4}$, $I_B^{t+5}$, $I_R^{t+6}$, ..., etc. An equivalent step would be to select the images, instead of the vectors, on a rotational basis.

In step 107, a mesh or 3-D matrix $M^t$ by manipulating the image $\hat{I}_c^t$ and the depth map $\hat{D}_c^t$ as described above. A corresponding texture map incorporating the intensity values for each coordinate is also kept. The mesh $M^t$ is then combined, or interpolated, with the selected vector $V_X^t$ (ST 108). In this manner, the resulting predicted image $PI_X^t$ will portray the mesh $M^t$ in the viewpoint of vector $V_X^t$.

The predicted image $PI_X^t$ is compared with the selected image $I_X^t$ in order to calculate the prediction errors $PE^t$ required to reconstruct image $I_X^t$ from predicted image $PI_X^t$ (ST 109). The prediction errors $PE^t$ are calculated by examining the differences between the image $I_X^t$ and the predicted image $PI_X^t$.

If bandwidth allows, another vector can be selected so that the prediction errors for the new viewpoint can be determined (ST 111). FIG. 5 illustrates two possible selected vectors/images sequences as related to time t. Otherwise, the entire process starts over (ST 111).

The prediction errors $PE^t$ are then encoded and outputted according to the MPEG-2 specification (ST 110). Similarly the selected vector $V_X^t$ is also outputted (ST 106).

Figure 6:
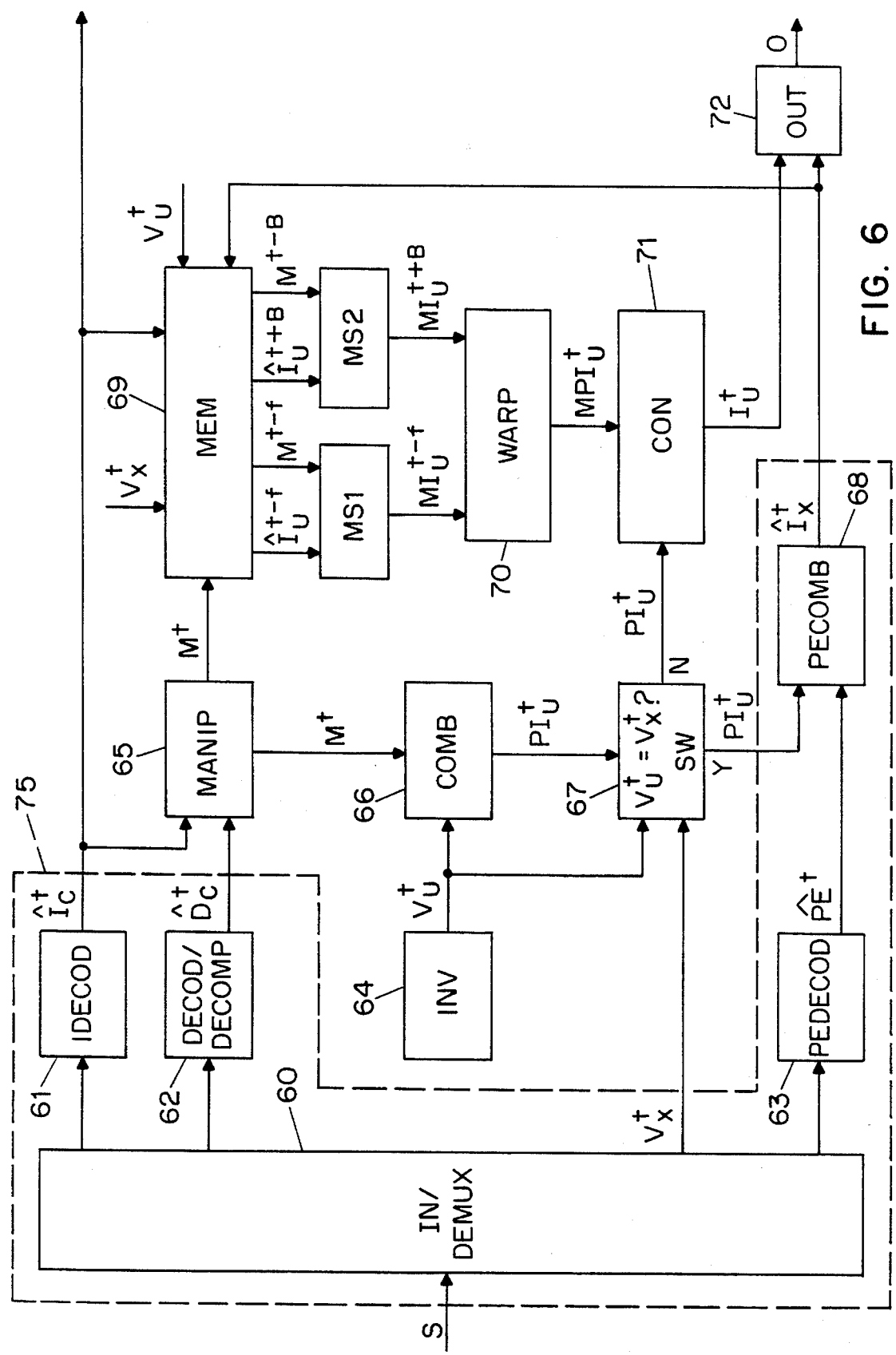
FIG. 6 illustrates a block diagram of an embodiment of the multi-viewpoint decoder of the present invention.

FIG. 6 schematically illustrates an embodiment of the multi-viewpoint video decoder of the present invention. The multi-viewpoint video decoder has an input/demultiplexer 60. The input/demultiplexer 60 receives a signal S and demultiplexes the information corresponding to the central image $I_c^t$, the depth map $D_c^t$, the selected viewpoint vector $V_X^t$ and prediction errors $PE^t$.

In addition, the multi-viewpoint video decoder has an image decoder 61, a decoder/decompressor 62 and a prediction error decoder 63 for decoding the central image $I_c^t$, the depth map $D_c^t$, the prediction errors $PE^t$, respectively. These decoders comply with the MPEG-2 standard and, more specifically, section 7 of the ISO document DIS 13818-2. In addition, the input/demultiplexer 60, the image decoder 61, the decoder/decompressor 62 and the prediction error decoder 63 are part of the MPEG-2 decoder 75 Once decoded the image $\hat{I}_c^t$ and the selected viewpoint vector $V_X^t$ are stored in memory 69.

The multi-viewpoint video decoder also has a vector input 64. A person can input any desired vector $V_U^t$ to display through any variation of vector input 64, including a head tracker, a joystick, a mouse, a light pen, a trackball, a desk pad, verbal commands, etc.

A predictor 76 contains two essential elements: a matrix manipulator 65 and a combiner 66. The matrix manipulator 65 forms a mesh or 3-D matrix $M^t$ by combining the image $\hat{I}_c^t$ and the depth map $\hat{D}_c^t$, in the manner described above. This resulting mesh $M^t$ is stored in a memory 69. A corresponding texture map incorporating the intensity values for each coordinate is also kept. The combiner 66 interpolates the mesh $M^t$ with the desired vector $V_U{}^t$. In this manner, the resulting predicted image $PI_U{}^t$ will portray the mesh $M^t$ in the viewpoint of vector $V_U{}^t$. These processes are further explained in James Foley et al., *Computer Graphics Principles and Practice*, Addison-Wesley Publishing Co. (2d ed. 1990). In addition, hardware-based solutions for the matrix manipulator and the combiner can be found throughout the computer graphics field.

A switch 67 is dependent on the relation between the desired vector $V_U{}^t$ and the selected vector $V_X{}^t$. If both vectors are equal, the predicted image $PI_U{}^t$ is then combined with the prediction errors $\hat{PE}^t$ via the prediction error combiner 68. (The prediction error combiner 68 is also part of the MPEG-2 decoder 75.) The resulting reconstructed image $\hat{I}_x{}^t$ is then stored in memory 69 and outputted via the output 72.

If the desired vector $V_U{}^t$ and the selected vector $V_X{}^t$ are not equal, the constructor 77 is then used. The constructor 77 has several essential elements: the memory 69, the mesh imagers MS1 and MS2, the warping module 70, and the constructing module 71. The nearest past reconstructed image in the desired viewpoint $\hat{I}_v{}^{t-f}$, the mesh $M^{t-f}$ respective to the nearest past reconstructed image $\hat{I}_v{}^{t-f}$, the nearest future reconstructed image in the desired viewpoint $\hat{I}_v{}^{t+B}$, and the mesh $M^{t+B}$ respective to the nearest future reconstructed image $\hat{I}_v{}^{t+B}$, all stored in memory 69, are retrieved upon the input of the desired viewpoint vector $V_U{}^t$.

The nearest past reconstructed image $\hat{I}_v{}^{t-f}$ and its respective mesh $M^{t-f}$ are combined to form a nearest past mesh image $MI_c{}^{t-f}$ by the mesh imager MS1. Similarly the nearest future reconstructed image $\hat{I}_v{}^{t+B}$ and its respective mesh $M^{t+B}$ are combined to form a nearest future mesh image $MI_c{}^{t+B}$ by the mesh imager MS2. This process is further explained in James Foley et al., *Computer Graphics Principles and Practice*, Addison-Wesley Publishing Co. (2d ed. 1990). In addition, hardware-based solutions for this combiner can be found throughout the computer graphics field.

The nearest past mesh image $MI_c{}^{t-f}$ and the nearest future mesh image $MI_c{}^{t+B}$ are then warped by the warping module 70 to form an intermediate mesh image $MPI_U{}^t$ for the time t. Additionally, the warping procedure should weigh the desired time t in order to provide a proper intermediate mesh image. Accordingly, if the time t is closer to time t−f than to time t+B, the warped intermediate mesh image will reflect an image closer to the image at time t−f rather than at time t+B. The warping process is further explained in George Woldberg, *Digital Image Warping*, IEEE Computer Society Press (1990). In addition, hardware-based solutions for this warping module can be found throughout the computer graphics field.

This mesh image is then combined with the predicted image $PI_U{}^t$ by the constructing module 71. The combination process is further explained in Y. T. Zhou, "Multi-Sensor Image Fusion," *International Conference on Image Processing*, Austin, Tex., U.S.A. (1994). The constructing module 71 can be as simple as an exclusive OR (XOR) logic gate. In addition, other hardware-based solutions for this constructing module can be found throughout the computer vision/image fusion field.

The resulting constructed image $I_U{}^t$ is then outputted via the output 72.

The mesh imaging, warping and construction algorithms to be used depend on the system capabilities, including processing speed, bandwidth capability, desired picture quality, number of available viewpoint images, etc. Nevertheless, these algorithms should be translated into a hardware solution, either hard-wired, logic table-based, etc., so that the images can be processed at a faster rate than with a software solution.

Figure 7:
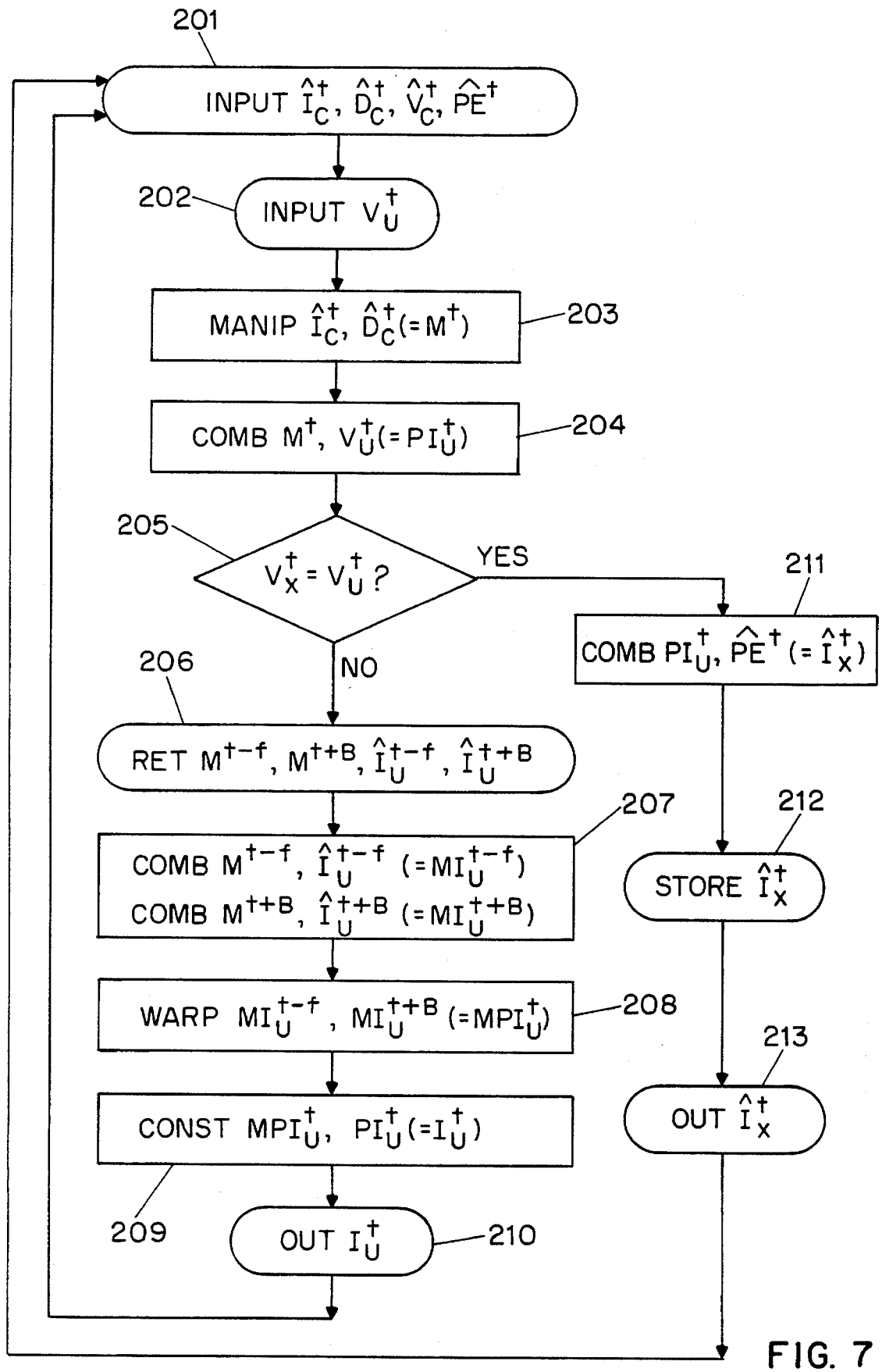
FIG. 7 is a flow chart illustrating the decoding process of the multi-viewpoint decoder of the present invention.

FIG. 7 illustrates the flow chart of the method for decoding multi-viewpoint video. In Step 201, the image $\hat{I}_.{}^t$, the depth map $\hat{D}_.{}^t$, the selected viewpoint vector $V_X{}^t$, and the prediction errors $PE^t$ are inputted into the multi-viewpoint video decoder of FIG. 6. Similarly, a user-desired vector $V_U{}^t$ is selected and inputted (ST 202).

The image $\hat{I}_.{}^t$ and the depth map $\hat{D}_.{}^t$ are combined through matrix manipulations to forms a mesh or 3-D matrix $M^t$, in the manner described above (ST 203). A corresponding texture map incorporating the intensity values for each coordinate is also kept. Further, the mesh $M^t$ is interpolated with the desired vector $V_U{}^t$ to form predicted image $PI_U{}^t$, which portrays the mesh $M^t$ in the viewpoint of vector $V_U{}^t$ (ST 204).

Step 205 is dependent on the relation between the desired vector $V_U{}^t$ and the selected vector $V_X{}^t$. If both vectors are equal, the predicted image $PI_U{}^t$ is then combined with the prediction errors $\hat{PE}^t$ (ST 211). The resulting reconstructed image $\hat{I}_x{}^t$ is then stored (ST 212) and outputted (ST 213). Then the process starts over again.

However, if the desired vector $V_U{}^t$ and the selected vector $V_X{}^t$ are not equal, the nearest past reconstructed image in the desired viewpoint $\hat{I}_v{}^{t-f}$, the mesh $M^{t-f}$ respective to the nearest past reconstructed image $\hat{I}_v{}^{t-f}$, the nearest future reconstructed image in the desired viewpoint $\hat{I}_v{}^{t+B}$, and the mesh $M^{t+B}$ respective to the nearest future reconstructed image $\hat{I}_v{}^{t+B}$ are retrieved from memory (ST 206). The nearest past reconstructed image $\hat{I}_v{}^{t-f}$ and its respective mesh $M^{t-f}$ are combined to form a nearest past mesh image $MI_U{}^{t-f}$ (ST 207). Similarly, the nearest future reconstructed image $\hat{I}_v{}^{t+B}$ and its respective mesh $M^{t+B}$ are combined to form a nearest future mesh image $MI_U{}^{t+B}$ (ST 207). The nearest past mesh image $MI_U{}^{t-f}$ and the nearest future mesh image $MI_U{}^{t+B}$ are then warped to form an intermediate mesh image $MPI_U{}^t$ for the time t (ST 208). Additionally, the warping procedure should weigh the desired time t in order to provide a proper intermediate mesh image. Accordingly, if the time t is closer to time t−f than to time t+B, the warped intermediate mesh image will reflect an image closer to the image at time t−f rather than at time t+B.

This mesh image is then combined with the predicted image $PI_U{}^t$ (ST 209). The resulting constructed image $I_U{}^t$ is then outputted (ST 210). Then the process starts over again.

If all the images for each non-central viewpoint are desired, i.e., $I_L{}^t$, $I_B{}^t$, $I_R{}^t$, $I_T{}^t$, the process described above should be repeated for each viewpoint.

It will be understood that the invention is not limited to the embodiments described and illustrated herein as they have been given only as examples of the invention. Without going beyond the scope of the invention aS defined by the claims, certain arrangements may be changed or certain components may be replaced by equivalent components. For example, the depth map $\hat{D}_.{}^t$ and the image $\hat{I}_.{}^t$ need not be manipulated together to form a mesh $M^t$, which is later combined with a viewpoint vector. Instead, both the depth map $\hat{D}_.{}^t$ and the image $\hat{I}_.{}^t$ can each be combined with the viewpoint vector and later be reconstructed. Similarly, the nearest past and future meshes need not be stored in memory. Instead, the nearest past and future images can be stored in memory and later combined with stored depth maps to form the meshes.

We claim:

1. A multi-viewpoint video encoder comprising:
   a depth estimator;
   a predictor connected to the depth estimator; and
   a comparator connected to the predictor.

2. The multi-viewpoint video encoder of claim 1, further comprising an output.

3. The multi-viewpoint video encoder of claim 2, wherein the output further comprises a multiplexer for multiplexing the first image, the depth map, the second viewpoint vector and the prediction errors.

4. The multi-viewpoint video encoder of claim 1, further comprising a depth map compressor.

5. The multi-viewpoint video encoder of claim 4, wherein the depth map is compressed according to a video compression standard.

6. The multi-viewpoint video encoder of claim 5, wherein the video compression standard is compatible with the MPEG-2 standard.

7. The multi-viewpoint video encoder of claim 1, further comprising a first image encoder.

8. The multi-viewpoint video encoder of claim 7, wherein the first image encoder encodes the first image according to a video coding standard.

9. The multi-viewpoint video encoder of claim 8, wherein the video coding standard is compatible with the MPEG-2 standard.

10. A multi-viewpoint video encoder comprising:
    an MPEG-2 encoder;
    a depth estimator connected to the MPEG-2 encoder; and
    a predictor connected to the depth estimator and the MPEG-2 encoder.

11. The multi-viewpoint video encoder of claim 10, wherein the predictor further comprises a manipulator, a combiner, and a vector selector.

12. A multi-viewpoint video decoder comprising:
    a receiver;
    a predictor connected to the receiver; and
    a reconstructor connected to the predictor and the receiver.

13. The multi-viewpoint video decoder of claim 12, wherein the predictor further comprises a manipulator and a combiner.

14. The multi-viewpoint video decoder of claim 12, further comprising a depth map decompressor.

15. A multi-viewpoint video decoder comprising:
    an MPEG-2 decoder; and
    a predictor connected to the MPEG-2 decoder.

16. The multi-viewpoint video decoder of claim 15, wherein the predictor further comprises a manipulator and a combiner.

17. A multi-viewpoint video decoder comprising:
    a receiver; and
    a predictor connected to the receiver.

18. The multi-video decoder of claim 17, wherein the predictor further comprises a manipulator and a combiner.

19. The multi-viewpoint video decoder of claim 17, further comprising a depth map decompressor connected between the predictor and the receiver.

20. The multi-viewpoint video decoder of claim 17, further comprising a desired viewpoint vector input.

21. The multi-viewpoint video decoder of claim 17, further comprising:
    a constructor connected to the predictor.

22. The multi-viewpoint video decoder of claim 21, the constructor further comprising a memory.

23. A multi-viewpoint video decoder comprising:
    an MPEG-2 decoder; and
    a predictor connected to the MPEG-2 decoder.

24. The multi-video decoder of claim 23, wherein the predictor further comprises a manipulator and a combiner.

25. The multi-viewpoint video decoder of claim 23, further comprising a constructor connected to the predictor.

26. The multi-viewpoint video decoder of claim 25, further comprising a desired viewpoint vector input.

27. A method for encoding multi-viewpoint video, comprising the steps of:
    selecting a first image having a first viewpoint vector;
    forming a depth map for the first image;
    selecting a second image having a second viewpoint vector;
    predicting a predicted second image having the second viewpoint vector by manipulating the first image and the depth map to reflect the second viewpoint vector; and
    calculating prediction errors for reconstructing the second image from the predicted second image.

28. The method of encoding multi-viewpoint video of claim 27, further comprising the step of transmitting the first image, the depth map, the second viewpoint vector and the prediction errors.

29. The method of encoding multi-viewpoint video of claim 28, wherein the transmission step comprises multiplexing the first image, the depth map, the second viewpoint vector and the prediction errors into a signal.

30. The method of encoding multi-viewpoint video of claim 27, wherein the prediction errors calculation step comprises comparing the second image and the predicted second image.

31. The method of encoding multi-viewpoint video of claim 27, further comprising the step of compressing the depth map.

32. The method of encoding multi-viewpoint video of claim 31, wherein the depth map compression step is performed according to a video compression standard.

33. The method of encoding multi-viewpoint video of claim 32, wherein the video compression standard is compatible with the MPEG-2 standard.

34. The method of encoding multi-viewpoint video of claim 27, further comprising the step of encoding the first image.

35. The method of encoding multi-viewpoint video of claim 34, wherein the image encoding step is performed according to a video coding standard.

36. The method of encoding multi-viewpoint video of claim 35, wherein the video coding standard is compatible with the MPEG-2 standard.

37. A method for decoding multi-viewpoint video, comprising the steps of:
    receiving a first image having a first viewpoint, a depth map, a second viewpoint vector and prediction errors;
    forming a predicted second image having the second viewpoint vector by manipulating the first image and the depth map to reflect the second viewpoint vector; and
    reconstructing a second image having the second viewpoint vector by combining the prediction errors and the predicted second image.

38. A method for decoding multi-viewpoint video, comprising the steps of:

receiving a first image having a first viewpoint vector, a depth map, a second viewpoint vector and prediction errors; and constructing a predicted second image having a desired viewpoint vector by manipulating the first image and the depth map to reflect the desired viewpoint vector.

39. The method of decoding multi-viewpoint video of claim 38, further comprising the step of obtaining the desired viewpoint vector.

40. The method of decoding multi-viewpoint video of claim 38, further comprising the step of decompressing the depth map.

41. The method of decoding multi-viewpoint video of claim 38, further comprising the steps of:

constructing a second image having the desired viewpoint vector by combining a first stored mesh, a second stored mesh, a first stored reconstructed image, a second stored reconstructed image, and the predicted second image.

42. The method of decoding multi-viewpoint video of claim 41, wherein the first stored reconstructed image is a nearest past stored reconstructed image having the desired viewpoint vector.

43. The method of decoding multi-viewpoint video of claim 42, wherein the first stored mesh is a stored mesh respective to the nearest past stored reconstructed image.

44. The method of decoding multi-viewpoint video of claim 41, wherein the second stored reconstructed image is a nearest stored future reconstructed image having the desired viewpoint vector.

45. The method of decoding multi-viewpoint video of claim 44, wherein the second stored mesh is a stored mesh respective to the nearest stored future reconstructed image.

46. The method of decoding multi-viewpoint video of claim 41, wherein the second image construction step further comprises the steps of:

combining the first stored mesh and the first stored reconstructed image to form a first mesh image;

combining the second stored mesh and the second stored reconstructed image to form a second mesh image;

warping the first and second mesh images to form an intermediate mesh image; and constructing the second image by combining the intermediate mesh image with the predicted second image.

\* \* \* \* \*

UNITED STATES PATENT AND TRADEMARK OFFICE
CERTIFICATE OF CORRECTION

| | | |
|---|---|---|
| PATENT NO. | : 5,617,334 | |
| APPLICATION NO. | : 08/505051 | |
| DATED | : April 1, 1997 | |
| INVENTOR(S) | : Tseng et al. | |

It is certified that error appears in the above-identified patent and that said Letters Patent is hereby corrected as shown below:

On Page 1, Column 1, line 5, please insert the following header and paragraph:

-- Statement Regarding Federally Sponsored Research or Development
This invention was made with government support under grant number 8811111 awarded by the National Science Foundation. The government has certain rights in the invention. --

Signed and Sealed this

Twenty-fourth Day of June, 2008

JON W. DUDAS
*Director of the United States Patent and Trademark Office*